US011558415B1

(12) United States Patent
McDonald et al.

(10) Patent No.: US 11,558,415 B1
(45) Date of Patent: Jan. 17, 2023

(54) REAL TIME APPLICATION PROTECTION SYSTEM RISK IDENTIFICATION AND MITIGATION

(71) Applicant: Wells Fargo Bank, N.A., San Francisco, CA (US)

(72) Inventors: Matthew Thomas McDonald, Callahan, FL (US); Jeremy W. Long, Herndon, VA (US); Mitch Moon, Plymouth, MN (US); Isaiah Adonu, Oro Valley, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/122,681

(22) Filed: Dec. 15, 2020

Related U.S. Application Data

(60) Provisional application No. 62/972,280, filed on Feb. 10, 2020.

(51) Int. Cl.
*H04L 9/40* (2022.01)
(52) U.S. Cl.
CPC ...... *H04L 63/1433* (2013.01); *H04L 63/1416* (2013.01); *H04L 63/1441* (2013.01); *H04L 63/20* (2013.01)
(58) Field of Classification Search
CPC ............ H04L 63/1433; H04L 63/1416; H04L 63/1441; H04L 63/20
USPC .......................................................... 726/1
See application file for complete search history.

(56) References Cited

U.S. PATENT DOCUMENTS

| 7,797,540 B2* | 9/2010 | Conley ............... H04L 63/1416 713/176 |
| 8,843,915 B2* | 9/2014 | Liverance ................. G06F 8/65 713/168 |
| 10,326,672 B2 | 6/2019 | Scheib et al. |
| 10,341,377 B1* | 7/2019 | Dell'Amico ........ H04L 63/1441 |
| 2005/0039047 A1* | 2/2005 | Raikar ............... H04L 63/1408 726/4 |
| 2006/0253906 A1* | 11/2006 | Rubin ..................... H04L 63/20 726/23 |

(Continued)

OTHER PUBLICATIONS

U.S. Appl. No. 17/122,635, filed Dec. 15, 2020, naming inventors McDonald et al.
(Continued)

*Primary Examiner* — Teshome Hailu
(74) *Attorney, Agent, or Firm* — Shumaker & Sieffert, P.A.

(57) ABSTRACT

Techniques are described for improving real-time application protection (RTAP) systems (e.g., web application firewalls (WAFs), runtime application self-protection (RASP) systems). In particular, a device within a trusted network may be configured to identify risks of the RTAP systems. For example, the device may compare a plurality of attack signatures, from configuration settings of an application protection system to a plurality of defects from a defect data store; determine that at least one configuration setting of the application protection system corresponding to an application does not include protections for at least one defect of the plurality of defects; and in response to determine that the at least one configuration setting of the application protection system does not include protections for the at least one defect, generate an alert corresponding to the at least one defect.

14 Claims, 4 Drawing Sheets

(56) References Cited

U.S. PATENT DOCUMENTS

| | | | |
|---|---|---|---|
| 2009/0293126 A1* | 11/2009 | Archer | G06F 21/562 726/24 |
| 2010/0057478 A1* | 3/2010 | Hamilton, II | G07F 17/3241 709/224 |
| 2012/0278892 A1* | 11/2012 | Turbin | G06F 21/53 717/171 |
| 2015/0213272 A1 | 7/2015 | Shezaf et al. | |
| 2015/0271193 A1 | 9/2015 | Estes et al. | |

OTHER PUBLICATIONS

U.S. Appl. No. 17/122,734, filed Dec. 15, 2020, naming inventors McDonald et al.

U.S. Appl. No. 17/122,765, filed Dec. 15, 2020, naming inventors McDonald et al.

* cited by examiner

REAL TIME APPLICATION PROTECTION SYSTEM RISK IDENTIFICATION AND MITIGATION

This application claims the benefit of U.S. Provisional Application No. 62/972,280, filed Feb. 10, 2020, the entire contents of which is incorporated herein by reference.

TECHNICAL FIELD

This disclosure relates to computer systems and, in particular, application security for computer systems.

BACKGROUND

Web applications are client-server computer programs in which client-side operations and user interface(s) run on a web browser. The server-side operations of web applications may be implemented by a computer network including a number of servers and computing devices. For example, a web application running on a server, accessed via a web browser, may communicate, via the Internet, with a database server of a computer network to access files or other information. In some instances, one or more real-time application protection systems may be deployed to monitor network data and identify data that may be malicious based on one or more configurations. For example, a web application firewall (WAF) system may filter, monitor, and block malicious data to and from a web application based on one or more configurations of the WAF. Similarly, a runtime application self-protection (RASP) system detects and reports or blocks malicious data based on one or more configurations of the RASP and runtime information of the web application. WAF or RASP systems may be commercial off-the-shelf systems that can be interacted with via one or more application programming interfaces (APIs). Configurations for one or more real-time application protection systems may be changed over time from the baseline configurations, which may leave the web applications vulnerable to potential network attacks.

SUMMARY

In general, this disclosure describes computer systems for improving real-time application protection (RTAP) systems (e.g., web application firewalls (WAFs), runtime application self-protection (RASP) systems, and the like). RTAP systems may be commercial off-the-shelf systems that can be interacted with via one or more application programming interfaces (APIs).

In one example, a device within a trusted network may test the configurations of RTAP systems of an enterprise business to determine whether a configuration does not include protections (e.g., one or more rules to block or report) for one or more known attacks from a defect data store within the trusted network. If a configuration does not include protections for one or more known attacks (e.g., one or more rules to block or report particular attacks), the device may generate a respective signature with a rule corresponding to the one or more attacks and/or generate an alert identifying the one or more configurations and the one or more unaddressed attacks. Additionally or alternatively, the device may test web applications to identify one or more defects and correlate the one or more defects to attack signatures from a defect data store within the trusted network. If at least one defect does not correlate to an attack signature, the device may generate a new attack signature corresponding to the defect and update the configuration with the new signature (e.g., via an interface or API). In this way, the device may test the RTAP systems to ensure it is configured to protect against known defects.

In another example, this disclosure is directed to a computer-implemented method including comparing a plurality of attack signatures, from configuration settings of an application protection system to a plurality of defects from a defect data store; determining that at least one configuration setting of the application protection system corresponding to an application does not include protections for at least one defect of the plurality of defects; and in response to determining that the at least one configuration setting of the application protection system does not include protections for the at least one defect, generating an alert corresponding to the at least one defect.

In another example, this disclosure is directed to a computer-readable medium storing instructions that, when executed by a computing system, cause one or more processors of the computing system to compare a plurality of attack signatures, from configuration settings of an application protection system to a plurality of defects from a defect data store; determine that at least one configuration setting of the application protection system corresponding to an application does not include protections for at least one defect of the plurality of defects; and in response to determine that the at least one configuration setting of the application protection system does not include protections for the at least one defect, generate an alert corresponding to the at least one defect.

The details of one or more examples are set forth in the accompanying drawings and the description below. Other features, objects, and advantages will be apparent from the description and drawings, and from the claims.

DETAILED DESCRIPTION

Figure 1:
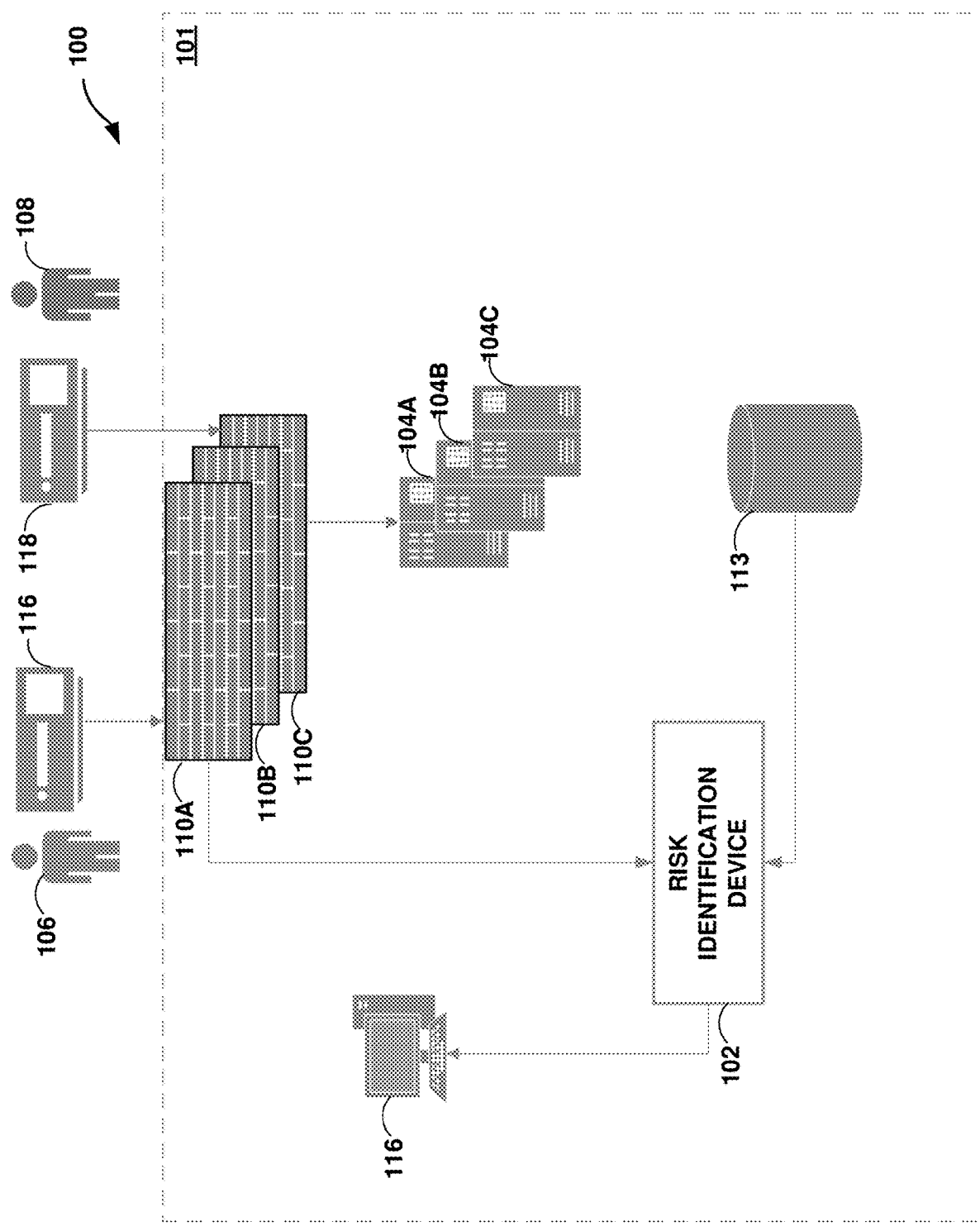
FIG. 1 is a block diagram illustrating an example computing system configured to identify risks of real-time application protection systems according to the techniques of this disclosure.

FIG. 1 is a block diagram illustrating an example computing system 100 configured to identify risks of real-time application protection (RTAP) systems 110A-110C (collectively, "RTAP systems 110") according to the techniques of this disclosure. RTAP systems 110 may include web application firewalls (WAFs), runtime application self-protection (RASP) systems, and the like). RTAP systems 110 may be commercial off-the-shelf systems that can by interacted with via one or more application programming interfaces (APIs). For example, RTAP systems 110 may be configured or deployed through one or more APIs. Additionally, information from RTAP system 110 may be obtained through one or more APIs. In some examples, RTAP systems 110 may include deployed agents that may interacted with through a centralized server using an API.

In particular, system 100 includes a trusted network 101 that hosts web applications 104A-104C (collectively, "applications 104"). Trusted network 101 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, trusted network 101 may comprise a combination of multiple networks. Trusted network 101 also includes RTAP systems 110 that monitor network data into and out of applications 104 to identify data that may be malicious based on one or more configurations of RTAP systems 110. In some examples, RTAP system 110A may correspond (e.g., monitor) application 104A, RTAP system 110B may correspond application 104B, and RTAP system 110C may correspond application 104C. For example, a computing device 116 operated by a user 106 may interact with application 104A (e.g., submit and obtain data from the application) while RTAP system 110A monitors the data traffic between the computing device 116 and application 104A. While three RTAP systems 110 and three applications 104 are shown in FIG. 1, system 100 may contain fewer or more RTAP systems 110 or applications 104. In another example, a computing device 118 operated by a malicious user 108 may attempt to submit malicious data or obtain data for which they are not authorized from application 104C (e.g., a denial of service attack, malicious HTTP POST/GET request, port scanning, a brute force attack) and RTAP system 110C may identify this malicious network traffic and block, report, and/or log it.

In some examples, computing device 116 and/or computing device 118 may be any suitable communication or computing device, such as a conventional or a mobile, non-mobile, wearable, and/or non-wearable computing device capable of communicating over network 18. For example, each of computing device 116, 118 may include any one or a combination of a conventional mobile phone, a smart phone, a smart watch, a tablet computer, a personal digital or virtual assistant, a gaming system, a media player, a smart television, an Internet of Things (IoT) device, an automobile or other vehicle, a laptop or notebook computer, a desktop computer, or any other type of wearable, non-wearable, mobile, and non-mobile computing device that may perform operations in accordance with one or more aspects of the present disclosure. One or more of computing device 116, 118 may support communication services over packet-switched networks, e.g., the public Internet, including Voice over Internet Protocol (VOIP).

In some examples, system 100 may store defect information in defect data store 113. For example, system 100 may store known defects, vulnerabilities, and/or attack signatures in defect data store 113. In some examples defect data store 113 may be a database, server, or any other computing system with storage. In some examples, one or more attack signatures stored in defect data store 113 may be received from third party, may correspond to a previously received attack by trusted network 101, or may be associated with known defects of any of RTAP systems 110.

In some examples, system 100 may include a risk identification device 102 configured to identify risks of RTAP systems 110. In general, risk identification device 102 may comprise one or more computing devices, such as servers, laptop or notebook computers, desktop computers, or any other type of computing devices that may perform operations in accordance with one or more aspects of the present disclosure.

In some examples, risk identification device 102 may compare attack signatures associated with known attacks from defect data store 113 to the current configurations of RTAP systems 110 to determine whether any of the current configurations of RTAP systems 110 do not include protections against at least one known attack or vulnerability.

In response to determining that a configuration of one or more RTAP systems 110 does not include protections against a known attack, risk identification device 102 may generate an alert and transmit that alert to security monitoring device 116. In some examples, the alert may include information about the known attack (e.g., the attack signature associated with the known attack or known vulnerability). In some examples, security monitoring device 116 may represent any type of computing devices that may be used by a user (e.g., desktop or laptop computer, tablet, a server, workstation). For example, security monitoring device 116 may be used by a system administrator of trusted network 101.

In some examples, risk identification device 102 may test applications 104 in a test environment to identify one or more defects and correlate those defects to attack signatures in defect data store 113. In some examples, risk identification device 102 may apply multiple security testing collected from multiple data sources to application 104 to identify the one or more defects. Examples of security testing include static application security testing (SAST), dynamic application security testing (DAST), manual penetration testing, etc. In some examples, risk identification device 102 may map one or more attach signatures in defect data store 113 with the identified one or more defects using Common Weakness Enumeration (CWE) list. If a detected defect does not correlate to any of the attack signatures in defect data store 113, risk identification device 102 may generate a new attack signature for the detected attack signature and store that new attack signature in defect data store 113. In some examples, the new attack signature may include a rule to address the detected defect.

In some examples, risk identification device 102 may identify one or more vulnerable configurations based on the one or more identified defects and may generate a risk report including the identified vulnerable configurations. In some examples, the risk report may further include suggestion of what may help to improve the security of the RTAP systems 110. In some examples, risk reports may include text or graphics in a GUI for presentation on risk identification device 102 and/or other devices. In some examples, risk reports may be communicated from risk identification device 102 to other devices in the form of application-based alerts, email messages, text messages, or any other electronic communication. For example, a risk report may be communicated in an email message, such as an emailed document or an emailed link. In some examples, the risk report may be transmitted in XML, format. As such, the disclosed techniques may enable a user to quickly and easily identify one or more vulnerable configurations of the RTAP systems 110.

Figure 2:
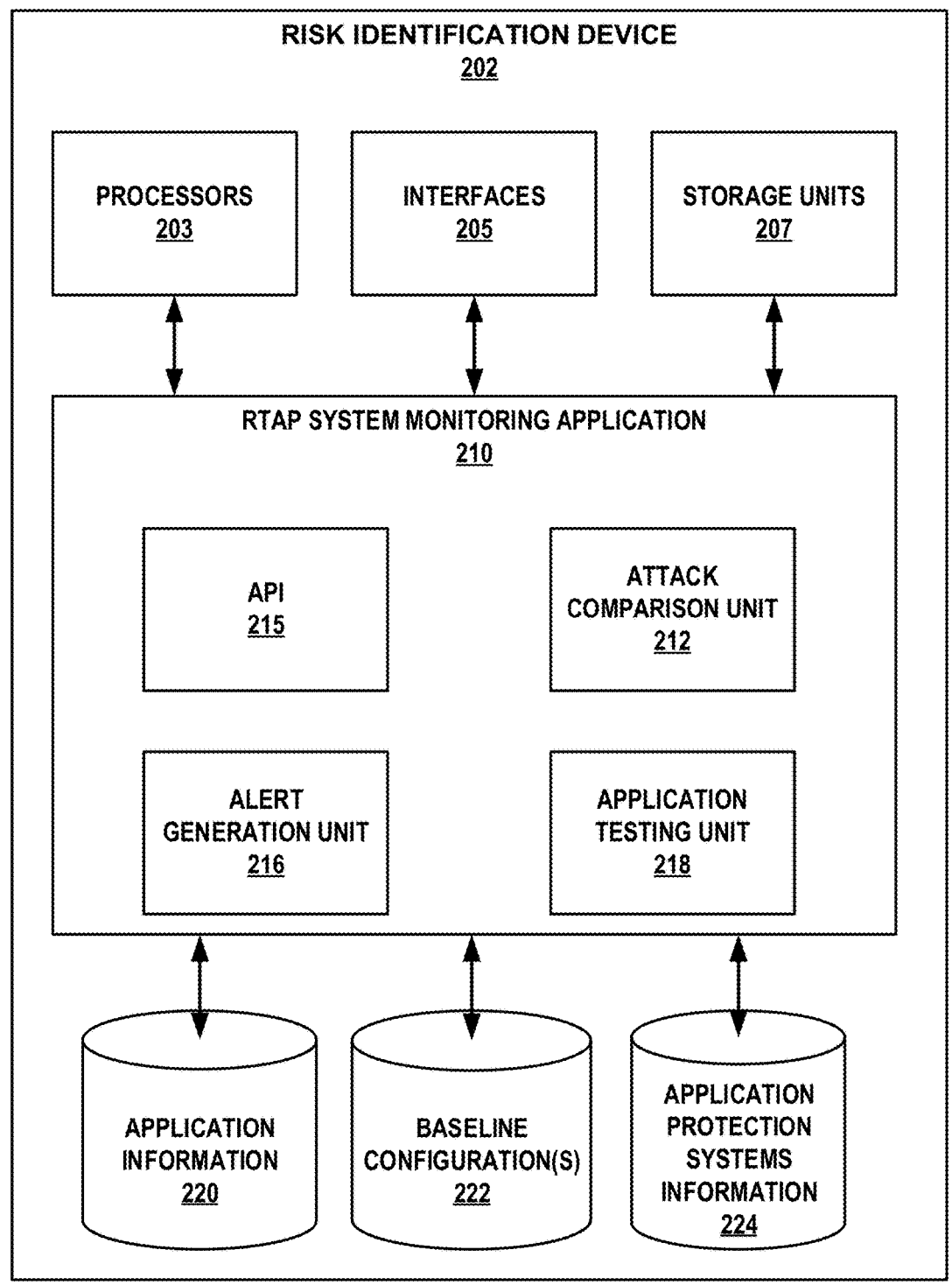
FIG. 2 is a block diagram illustrating an example set of components of a device configured to perform the techniques of this disclosure.

FIG. 2 is a block diagram illustrating an example set of components of risk identification device 202, which may be configured to perform the techniques of this disclosure. In the example of FIG. 2, risk identification device 202 includes processors 203, interfaces 205, storage units 207, RTAP system monitoring application 210, application information 220, baseline configurations 222, and RTAP systems information 224. RTAP system monitoring application 210 further includes application programming interface (API) 215, attack comparison unit 212, alert generating unit 216, and application testing unit 218. The components, units or modules of risk identification device 202 are coupled (physically, communicatively, and/or operatively) using communication channels for inter-component communications. In some examples, the communication channels may include a system bus, a network connection, an inter-process communication data structure, or any other method for communicating data.

Processors 203, in one example, may comprise one or more processors that are configured to implement functionality and/or process instructions for execution within risk identification device 202. For example, processors 203 may be capable of processing instructions stored by storage units 207. Processors 203 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 207 of risk identification device 202 may store an operating system (not shown) executable by processors 203 to control the operation of components of risk identification device 202. Storage units 207 may also be configured to store information within risk identification device 202 during operation. Storage units 207 may include a computer-readable storage medium or computer-readable storage device. In some examples, storage units 207 include one or more of a short-term memory or a long-term memory. Storage units 207 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 207 are used to store program instructions for execution by processors 203. Storage units 207 may be used by software or applications running on risk identification device 202 (e.g., RTAP system monitoring application 210) to temporarily store information during program execution.

Risk identification device 202 further includes RTAP system monitoring application 110, which may include application programming interface (API) 215, attack comparison unit 212, alert generating unit 216, and application testing unit 218. Risk identification device 202 may utilize interfaces 205 or API 215 to communicate with other systems or devices via one or more networks, e.g., RTAP systems 110 and/or defect data store 113 of FIG. 1. Interfaces 205 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, RTAP system monitoring application 210 utilizes interfaces 205 to wirelessly communicate with RTAP systems 110, applications 104 from FIG. 1. Although illustrated in FIG. 2 as including a single API 215, in other examples, RTAP system monitoring application 210 may include a plurality of APIs to pull data from one or more remote devices and/or interact with any of the other systems within trusted network 101 of FIG. 1.

Application information 220, baseline configurations 222, and RTAP systems information 224 represent one or more respective computer-readable storage media, which may be included within risk identification device 202 as shown in the example of FIG. 2. Alternatively, one or more of application information 220, baseline configurations 222, and RTAP systems information 224 may be stored in one or more remote devices from which risk identification device 202 may request data via interfaces 205 or API 215. The computer-readable storage media may be one or more of a hard disk, a flash drive, random access memory (RAM), or other such computer-readable storage media. Application information 220 may contain information about applications 104 including running status, testing status, and/or identification of individuals responsible for maintaining, updating, and/or testing each of applications 104. Baseline configurations 222 may contain the baseline configuration settings of each of RTAP systems 110. RTAP systems information 224 may include information about RTAP systems 110 including running status information, information about detected attacks, information about the application(s) each RTAP systems 110 is protecting.

In accordance with the techniques of this disclosure, attack comparison unit 212 of RTAP system monitoring application 210 may compare attack signatures associated with known attacks (e.g., attack signatures obtained from defect data store 113 of FIG. 2 via interfaces 205 or API 215) to the current configurations of RTAP system monitoring application 210 to determine whether any of the current configurations of RTAP system monitoring application 210 do not include protections against at least one known attack. In some examples, attack comparison unit 212 may compare the first plurality of attack signatures to the plurality of respective configurations while RTAP systems are in a production mode and not in a protection mode. The production mode may be a testing mode or another mode in which the RTAP system is not actively monitoring applications that are accessible outside of trusted network 101 of FIG. 1.

In response to determining that a configuration of one or more RTAP systems 110 does not include protections against a known attack, alert generation unit 216 may generate an alert and transmit that alert to security monitoring device 216 of FIG. 1. In some examples, the alert may include information about the known attack (e.g., the attack signature associated with the known attack or known vulnerability).

In some examples, application testing unit 218 may test applications 104 of FIG. 1 in a test environment to identify one or more defects and correlate those defects to attack signatures in defect data store 113 of FIG. 1. If a detected defect does not correlate to any of the attack signatures in defect data store 113, RTAP system monitoring application 210 may generate a new attack signature for the detected attack signature and store that new attack signature in defect data store 113. In some example, the new attack signature may include a rule to address the detected defect.

Figure 3:
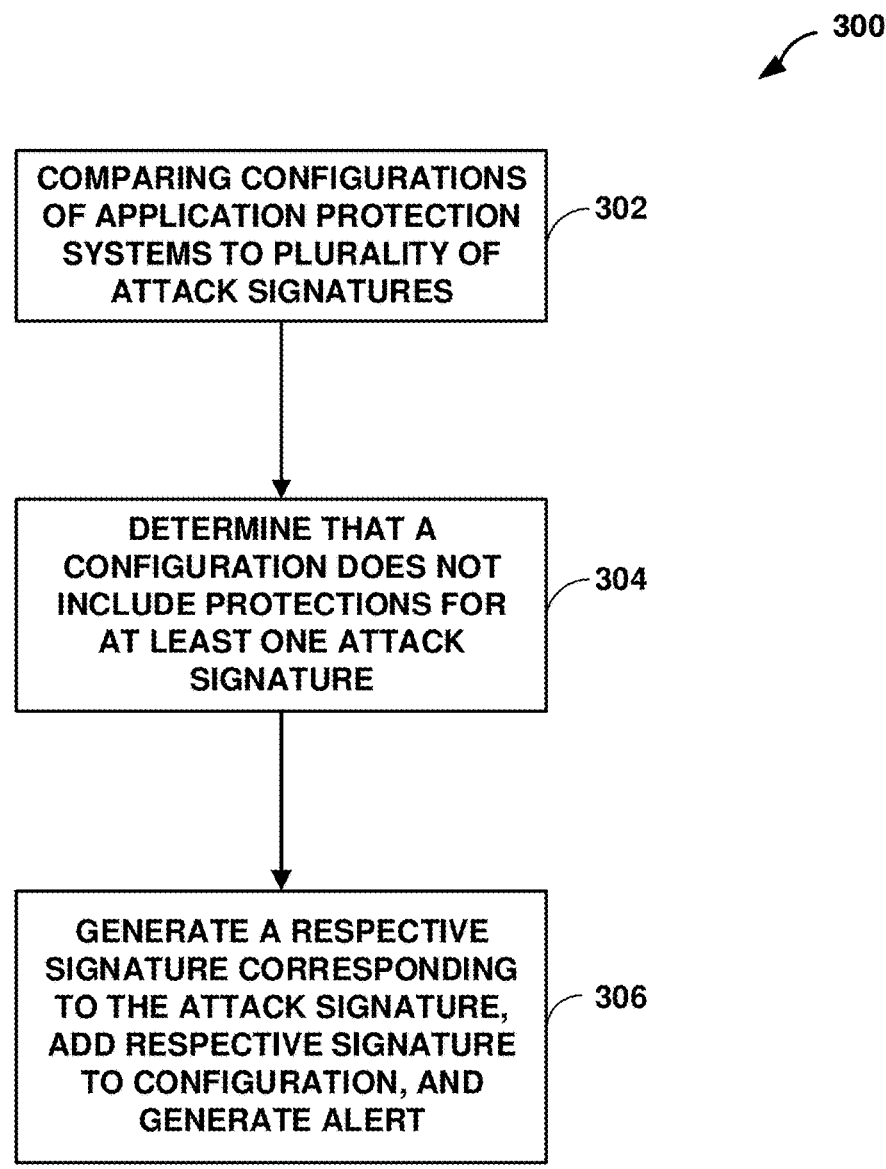
FIG. 3 is a flowchart illustrating an example method of identifying risks of real-time application protection systems according to the techniques of this disclosure.

FIG. 3 is a flowchart 300 illustrating an example method of identifying risks of RTAP systems according to the techniques of this disclosure. For purposes of example and explanation, the method of FIG. 3 is explained with respect to risk identification device 202 of FIG. 2. However, it should be understood that other computer devices may be configured to perform this or a similar method, including any of devices 102 or 202 of FIGS. 1-2.

Risk identification device 202 may compare configuration settings of RTAP systems (e.g., RTAP systems 110 of FIG. 1) to a plurality of attack signatures associated with known attacks and/or known application vulnerabilities (302). For example, risk identification device 202 may determine whether the plurality of attack signatures (e.g., from defect data store 113 of FIG. 1) are addressed in the current configuration settings of the RTAP systems to determine that a particular configuration does not include protections for at least one attack signature of the plurality of attack signatures (304). In some examples, risk identification device 202 may compare a plurality of attack signatures from the configuration settings of an RTAP system to a plurality of defects from defect data store and determine the configuration settings do not include protections for at least one of the plurality of defects. In response to determining that the configuration of an RTAP system does not include protections for at least one known attack signature (or defect), risk identification device 202 may generate a signature corresponding to the known attack (or defect), add the new signature to the current configuration of the RTAP system (e.g., via an API), and generate an alert corresponding to the new signature and/or the known attack/vulnerability being addressed (306). In some examples, the new signature may include a rule to block and/or report attacks associated with the attack signature (or defect).

Figure 4:
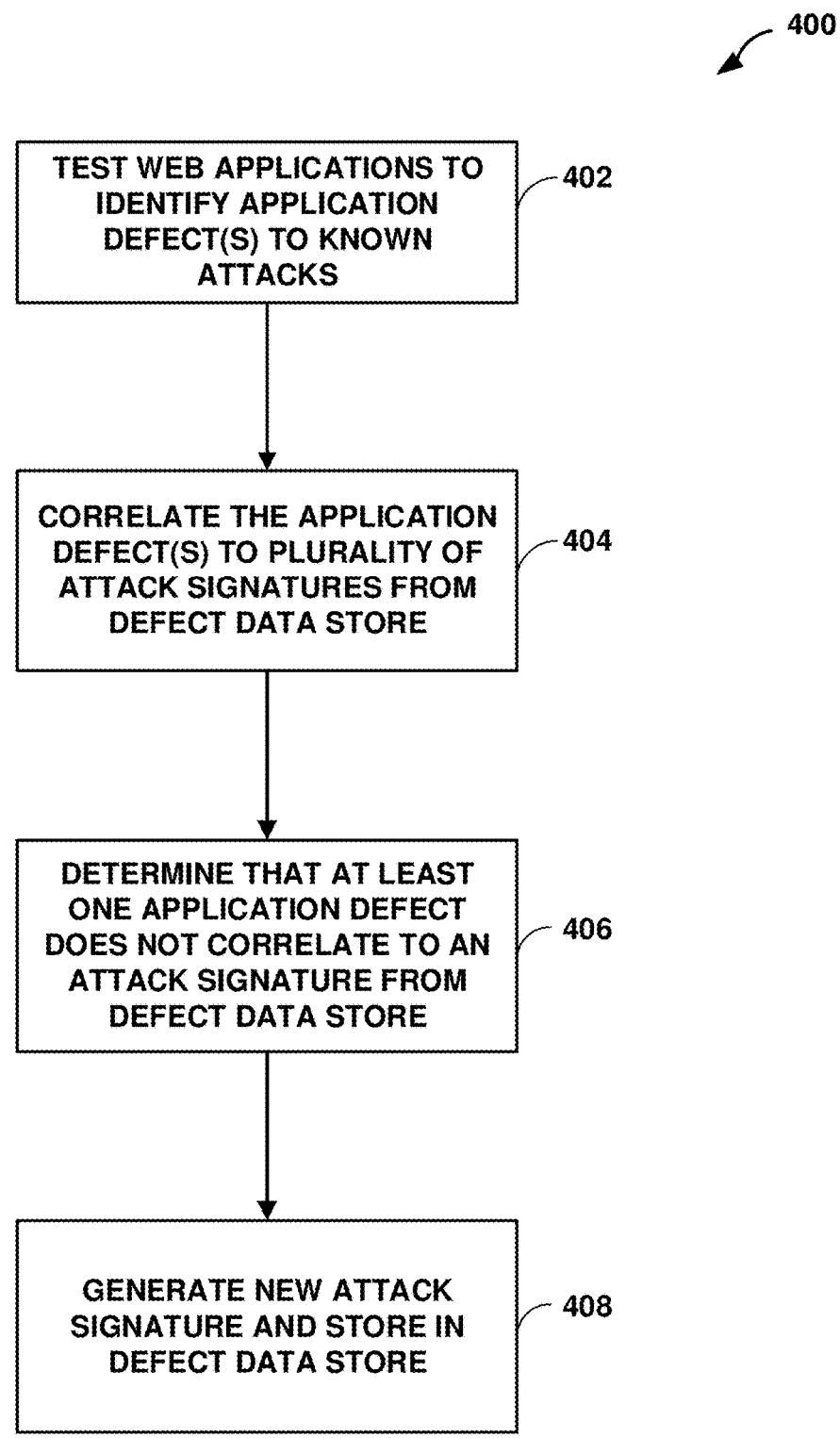
FIG. 4 is a flowchart illustrating another example method of identifying risks of real-time application protection systems according to the techniques of this disclosure.

FIG. 4 is a flowchart 400 illustrating another example method of identifying risks of RTAP systems according to the techniques of this disclosure. For purposes of example and explanation, the method of FIG. 4 is explained with respect to risk identification device 202 of FIG. 2. However, it should be understood that other computer devices may be configured to perform this or a similar method, including any of risk identification devices 102 or 202 of FIGS. 1-2. In some examples, the method of FIG. 4 may be performed serially or concurrently with the method of FIG. 3. For example, the method of FIG. 4 may be performed before the method of FIG. 3 is performed.

In accordance with techniques of this disclosure, risk identification device 202 may test web applications (e.g., applications 104 of FIG. 1) to identify one or more application defects associated with known attack signatures (402). For example, risk identification device 202 may simulate the known attacks to identify application defects associated with the known attacks. Risk identification device 202 may then correlate any identified application defects to a plurality of attack signatures from a defect data store (e.g., defect data store 113 of FIG. 1) (404). Risk identification device 202 may determine that at least one detected application defect does not correlate to any of the attack signatures in the defect data store (406) and, in response, generate a new attack signature corresponding to the application defect and store, via an interface or API, that new attack signature in the defect data store (408). In this way, the new attack signature may be used to test RTAP systems (e.g., as described above with reference to FIG. 3). In some example, the new attack signature may include a rule to address the detected application defect. In some examples, the new attack signature may also be added to one or more configuration settings of one or more RTAP systems.

The methods described above with respect to FIGS. 3-4 may be performed by the same device (e.g., any of devices 102, 202, and/or any suitable device). Additionally, the components and functionality described 202 may be combined into a single device that may implement all of the techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A computer-implemented method comprising:
comparing a plurality of attack signatures associated with a plurality of known attacks stored in a defect data store to configuration settings of an application protection system;
determining the configuration settings of the application protection system do not include protections for at least one known attack of the plurality of known attacks;
in response to determining the configuration settings of the application protection system do not include protections for the at least one known attack, generating an alert corresponding to the at least one known attack and adding the attack signature associated with the at least one known attack to the configuration settings of the application protection system;
testing a plurality of applications to identify one or more application defects;
correlating the identified one or more application defects to a plurality of defects from the defect data store; and
in response to determining that at least one of the identified one or more application defects does not correlate to one of the plurality of defects from the defect data store, generating a new attack signature for the at least one of the one or more application defects, adding the new attack signature to the configuration settings of the application protection system, and storing the new attack signature in the defect data store.

2. The method of claim 1, wherein the respective attack signature includes at least one rule to protect against the at least one defect.

3. The method of claim 1, further comprising:
receiving at least some of the plurality of attack signatures from a third party and adding the at least some of the plurality of attack signatures to the configuration settings.

4. The method of claim 1, further comprising:
obtaining at least some of the plurality of attack signatures from the defect data store and adding the at least some of the plurality of attack signatures to the configuration settings.

5. The method of claim 1, further comprising:
comparing the plurality of attack signatures to the plurality of defects while the application protection system is in a production mode and not in a protection mode.

6. The method of claim 1, wherein generating the alert corresponding to the at least one defect comprises transmitting the alert to a secondary device.

7. A device comprising:
a memory; and
one or more processors implemented in circuitry and in communication with the memory, the one or more processors configured to:
compare a plurality of attack signatures associated with a plurality of known attacks stored in a defect data store to configuration settings of an application protection system;
determine the configuration settings of the application protection system do not include protections for at least one known attack of the plurality of known attacks
in response to determining the configuration settings of the application protection system do not include protections for the at least one known attack, generate an alert corresponding to the at least one known attack and adding the attack signature associated with the at least one known attack to the configuration settings of the application protection system;
testing a plurality of applications to identify one or more application defects;
correlating the identified one or more application defects to a plurality of defects from the defect data store; and
in response to determining that at least one of the identified one or more application defects does not correlate to one of the plurality of defects from the defect data store, generating a new attack signature for the at least one of the one or more application defects, adding the new attack signature to the configuration settings of the application protection system, and storing the new attack signature in the defect data store.

8. The device of claim 7, wherein the respective signature includes at least one rule to protect against the at least one defect.

9. The device of claim 7, wherein the one or more processors are further configured to:
receive at least some of the plurality of attack signatures from a third party and add the at least some of the plurality of attack signatures to the configuration settings.

10. The device of claim 7, wherein the one or more processors are further configured to:
obtain at least some of the plurality of attack signatures from the defect data store and add the at least some of the plurality of attack signatures to the configuration settings.

11. The device of claim 7, wherein the one or more processors are further configured to:
compare the plurality of attack signatures to the plurality of defects while the application protection system is in a production mode and not in a protection mode.

12. The device of claim 7, wherein the one or more processors are further configured to transmit the alert to a secondary device.

13. A non-transitory computer-readable medium storing instructions that, when executed by a computing system, cause one or more processors of the computing system to:
compare a plurality of attack signatures associated with a plurality of known attacks stored in a defect data store to configuration settings of an application protection system;
determine the configuration settings of the application protection system do not include protections for at least one known attack of the plurality of known attacks
in response to determining the configuration settings of the application protection system do not include protections for the at least one known attack, generate an alert corresponding to the at least one known attack and adding the attack signature associated with the at least one known attack to the configuration settings of the application protection system;
testing a plurality of applications to identify one or more application defects;
correlating the identified one or more application defects to a plurality of defects from the defect data store; and
in response to determining that at least one of the identified one or more application defects does not correlate to one of the plurality of defects from the defect data store, generating a new attack signature for the at least one of the one or more application defects, adding the new attack signature to the configuration settings of the application protection system, and storing the new attack signature in the defect data store.

14. The non-transitory computer-readable medium of claim 13, wherein the respective signature includes at least one rule to protect against the at least one defect.

* * * * *